Figure 1:
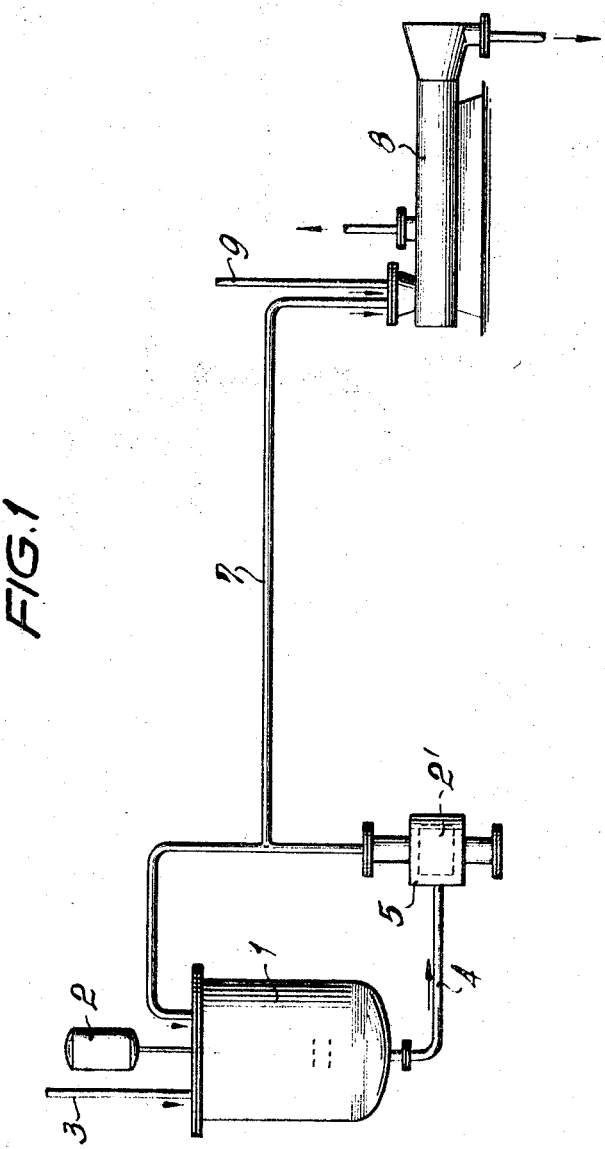

United States Patent

[11] 3,545,726

| [72] | Inventors | Heinz Herrmann<br>Stuttgart;<br>Joachim Kurt Herzberg, Beihingen,<br>Germany |
|---|---|---|
| [21] | Appl. No. | 741,704 |
| [22] | Filed | July 1, 1968 |
| [45] | Patented | Dec. 8, 1970 |
| [73] | Assignee | Werner & Pfleiderer<br>Stuttgart-Feuerbach, Germany |
| [32] | Priority | July 1, 1967 |
| [33] | | Germany |
| [31] | | No. W44295 |

[54] METHOD OF PREPARING MIXTURES OF SYNTHETIC MATERIALS AND ADDITIVES DISPERSED THEREIN
8 Claims, 2 Drawing Figs.

[52] U.S. Cl. .................................................. 259/1
[51] Int. Cl. .................................................. B01f 11/02
[50] Field of Search .................................... 259/(vibrator sonic), 1, 72

[56] References Cited
UNITED STATES PATENTS

| 2,363,247 | 11/1944 | Holder | 259/1 |
| 2,713,998 | 7/1955 | Eicken | 259/95 |
| 3,410,765 | 11/1968 | Bodine | 259/1X |

*Primary Examiner*—Robert W. Jenkins
*Attorney*—Cushman, Darby & Cushman

ABSTRACT: The invention provides a method of and apparatus for producing such fine dispersions, which comprises adding to pulverulent synthetic material at least twice the proportion of pulverulent additive that is required in the final mixture, to obtain a concentrated mixture; adding liquid to the said concentrated mixture to obtain a liquid-containing mixture, and subjecting the said liquid-containing mixture to ultrasonic sound vibrations whereby the additive is finely dispersed in the said liquid-containing mixture; and subjecting the liquid-containing mixture thus obtained to one or more treating stages whereby the desired final mixture is obtained.

METHOD OF PREPARING MIXTURES OF SYNTHETIC MATERIALS AND ADDITIVES DISPERSED THEREIN

This invention relates to a method of an and apparatus for producing mixtures of synthetic materials and additives finely dispersed therein.

In the production of mixtures of synthetic materials and additives, which may be pigments or substances intended to improve or determine the chemical or physical properties of the mixture, in which the latter are contained in finely dispersed form, one of the problems is so to disperse the additives that no agglomeration thereof remains in the mixture and the dispersion of the additive is as complete and stable as possible, and to achieve this in a simple and inexpensive way. The problem applies particularly to additives which are inherently difficult to disperse and for which conventional methods lead to the production of mixtures containing agglomerations of the additive which affects the quality of the final product.

A further disadvantage of conventional methods of mixing such materials, is that expensive plant or plant combinations are necessary, which due to their high power consumption considerably raise the production and operating costs, and which still fail to achieve the desired fine dispersion with difficult additives.

The method according to the invention provides a simple way of producing concentrates of additives in synthetic materials which contain a substantial proportion of difficulty dispersible additives, and of mixing these concentrates with the synthetic material in any proportions in simple machines so that the mixtures can be simultaneously melted and plasticised. The method of the invention permits a satisfactory dispersion to be obtained with a minimum expenditure of power by producing a stable distribution of the primary particles of the additive in the synthetic material.

The invention is a method of producing a mixture of a synthetic material and one or more additives dispersed therein, which comprises adding to pulverulent synthetic material at least twice the proportion of pulverulent additive that is required in the final mixture, to obtain a concentrated mixture; adding liquid to the said concentrated mixture to obtain a liquid-containing mixture, and subjecting the said liquid-containing mixture to ultrasonic sound vibrations whereby the additive is finely dispersed in the said liquid-containing mixture; and subjecting the liquid-containing mixture thus obtained to one or more treating stages whereby the desired final mixture is obtained.

The liquid added to the said concentrated mixture may or may not be a component of the recipe of the final mixture. If, however, it is not a component of the final recipe, the added liquid must be removed, for instance in a centrifuge, after the additive has been completely dispersed.

A preferred feature of the invention comprises circulating the said liquid-containing mixture through a plurality of separate ultrasonic sound treating stages, a procedure which enables the treatment to be optimally adapted to the nature of the mixture components and their dispersibility. If desired, the liquid-containing mixture may be withdrawn continuously or discontinuously from the circulating systems and introduced into a following treatment stage. This may include a liquid separator which eliminates liquids forming no part of the recipe, or further mixing machines, such as single shaft screw extruders or similar machines, in which the mixture can be further processed, e.g., melted and plasticised, with the expenditure of little power, and in which residual moisture may be removed by evaporation. The mixture may finally be granulated, if this is required, and the granulated mixture transferred to one or more further processing stage(s).

Apparatus for carrying out the invention consists of a mixture of a synthetic material and one or more additives dispersed therein, comprising a receiving vessel for components of the mixture to be prepared and a liquid, a plurality of vessels each containing an ultrasonic sound generator, and circulating means for circulating the said liquid-containing mixture from the said mixing vessel to at least one of the said vessels containing an ultrasonic sound generator to another of the said vessels.

In a preferred form of apparatus one of the ultrasonic sound generators is contained in the said receiving vessel.

The time the mixture is exposed to treatment by the ultrasonic sound generator(s) depends upon the nature of the mixture and particularly upon the nature of the additives, the proportions in which they are used, and their dispersibility. After the ultrasonic treatment has been completed the dispersion may be introduced into a liquid separator, if the liquid of the liquid-containing mixture is not a component of the final recipe. Otherwise the dispersion may be taken directly to a following treatment stage, for instance to a screw machine in which the final mixture can be prepared, i.e., melted down and plasticised with the into introduction of further quantities of synthetic material to achieve the required final composition. In either instance the proportion of mixture continuously withdrawn from the cycle may be continuously introduced into the screw machine and therein prepared with a prescribed further quantity of synthetic material or other substances and with the simultaneous evaporation of the residual moisture.

Figure 2:
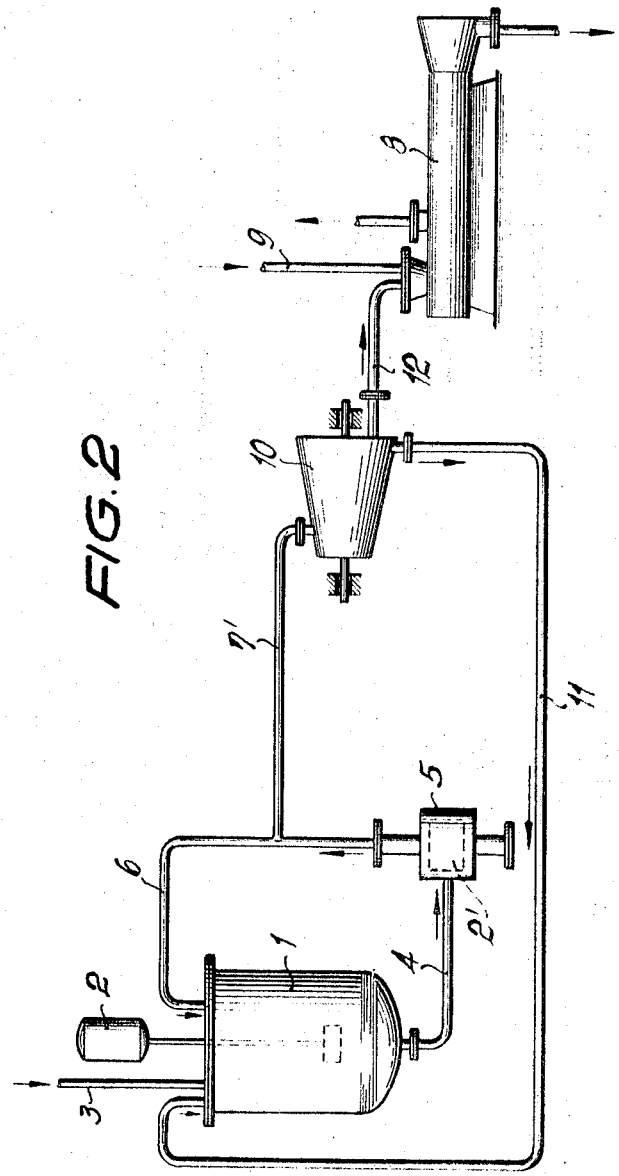

Embodiments of the invention are hereinafter described and illustrated in the accompanying drawings, of which:

FIG. 1 is a schematic representation of one form of apparatus according to the invention, and FIG. 2 is a schematic representation of a modification of the embodiment of FIG. 1.

Referring to the drawings, a vessel 1 for the reception of the mixture components is provided in its interior with an ultrasonic sound generator 2 which, according to the nature of the mixture components that are introduced through a pipe 3, operates to provide ultrasonic sound generators within a given frequency range. A pipe 4 connects the vessel 1 with a further container 5 containing a further ultrasonic sound generator 2', the mixture being recirculated through a pipe 6 which returns it from vessel 5 to vessel 1.

In the embodiment according to FIG. 1 of the drawing, the mixture can be processed by introducing a charge of the mixture components into the vessel 1 and then recycling the same for a given treating time through the two vessels 1 and 5, or the mixture components may be continuously introduced into vessel 1 and continuously withdrawn through a pipe 7 which takes it for further treatment to a screw machine 8, wherein a further proportion of the synthetic material with other additives if required are introduced into the mixture through pipe 9, the mixture being melted down, plasticised and granulated if required.

The embodiment illustrated in FIG. 1 of the drawing is intended for mixtures in which the liquid components form part of the recipe of the the mix and remain in the mixture. It If the liquid portion is not a component of the recipe, then the apparatus is provided with a liquid separator 10, preferably in the form of a centrifuge, as shown in FIG. 2 of the drawing. The introduction of the several components is otherwise exactly as in the embodiment according to FIG. 1.

The liquid portion that is separated in the centrifuge is returned through a pipe 11 into the treating vessel 1, the liquid being thus likewise recirculated.

It is possible continuously to withdraw part of the dispersion from the pipe 6 through the pipe 7' which leads to the centrifuge 10 and from the centrifuge 10 through a pipe 12 to a screw machine 8 for further processing therein.

The following examples of the invention are provided.

EXAMPLE 1

In this example, the liquid components form part of the final recipe.

The following components are introduced into vessel 1: 1 part of PVC, 0.4 parts of a blue pigment, 4 parts of a plasticiser.

The components are recycled for 20 minutes through the two vessels 1 and 5 in each of which they are exposed to ultrasonic sound at a frequency of 300 kc/s. The mixture is then taken through the pipe 7 into the screw machine 8, where it is further plasticised with six more parts of PVC. The quality of dispersion in the mixture is excellent and the mixture is entirely free from residual agglomerations of additives.

EXAMPLE 2

In this example the liquid components do not form part of the final recipe.

The following components are introduced into vessel 1: 1 part of low pressure polyethylene, 0.25 parts of carbon powder, 5 parts of H2O + traces of diazopone (wetting agent).

The components are treated for about 30 minutes by the two ultrasonic sound generators 2 and 2' at a frequency of 300 kc/s. Subsequently the water is separated in a centrifuge to a residual moisture content of 30 to 40 percent related to the moist material. The remaining water is then removed in the screw machine 8, the synthetic material together with the carbon being plasticised and finally granulated. The quality of the dispersion of the mixture is excellent. Carbon powder agglomerates are not found in the product.

EXAMPLE 3

In this example, the liquid components do not form part of the mixture.

The following components are introduced into vessel 1: 1 part of PVC (internally softened), 0.7 parts of a green pigment, 4 parts of methanol.

The components are treated in the same way as described in example 2. The quality of the final dispersion is excellent, and the depth of the colour much better than that obtainable by conventional processing methods.

The apparatus particularly described may be modified in many ways. For instance, different types of liquid separators could be provided and the method of exposing the mixture to ultrasonic sound generators may be carried out by any one of known methods.

We claim:

1. A method of producing a mixture of a synthetic material and one or more additives dispersed therein, which comprises adding to pulverulent synthetic material at least twice the proportion of pulverulent additive that is required in the final mixture, to obtain a concentrated mixture; adding liquid to the said concentrated mixture to obtain a liquid-containing mixture, and subjecting the said liquid-containing mixture to ultrasonic sound vibrations whereby the additive is finely dispersed in the said liquid-containing mixture; and subjecting the liquid-containing mixture thus obtained to at least one treating stages whereby the desired final mixture is obtained.

2. A method according to claim 1, in which the liquid added to the said concentrated mixture to produce the said liquid-containing mixture, is a component of the recipe of the said final mixture.

3. A method according to claim 1, in which the liquid added to the said concentrated mixture to produce the said liquid-containing mixture, is removed from the said liquid-containing mixture after said treatment thereof by ultrasonic sound vibrations.

4. A method according to claim 1, in which the said liquid-containing mixture is circulated through a plurality of separate ultrasonic sound treating stages.

5. A method according to claim 4 in which the said liquid-containing mixture is withdrawn from the cycle stream and introduced into a liquid separator wherein the liquid is removed form the said liquid-containing mixture.

6. Apparatus for producing a mixture of a synthetic material and one or more additives dispersed therein, comprising a receiving vessel for components of the mixture to be prepared and a liquid, a plurality of vessels each containing an ultrasonic sound generator, and circulating means for the said liquid-containing mixture from a mixing vessel to at least one of the said vessels containing an ultrasonic sound generator to another of the said vessels.

7. Apparatus according to claim 6, in which one of the ultrasonic sound generators is contained in the said receiving vessel.

8. Apparatus according to claim 6, in which liquid-separating means are provided for separating liquid from the said liquid-containing mixture after treatment by the said ultrasonic sound generators.

UNITED STATES PATENT OFFICE
Certificate

Patent No. 3,545,726                                                            Patented December 8, 1970

Heinz Herrmann and Joachim Kurt Herzberg

Application having been made by Heinz Herrmann and Joachim Kurt Herzberg, the inventors named in the patent above identified, and Warner & Pfleiderer, Stuttgart-Feuerbach, Germany, the assignee, for the issuance of a certificate under the provisions of Title 35, Section 256, of the United States Code, adding the name of Hans Werner as a joint inventor, and a showing and proof of facts satisfying the requirements of the said section having been submitted, it is this 11th day of January 1972, certified that the name of the said Hans Werner is hereby added to the said patent as a joint inventor with the said Heinz Herrmann and Joachim Kurt Herzberg.

FRED W. SHERLING
*Associate Solicitor.*